March 19, 1946. A. H. ROSENTHAL Re. 22,734

TELEVISION RECEIVING SYSTEM

Original Filed Jan. 27, 1939 3 Sheets-Sheet 1

INVENTOR.
ADOLPH H. ROSENTHAL
BY J. D. Allen,
ATTORNEY

March 19, 1946. A. H. ROSENTHAL Re. 22,734

TELEVISION RECEIVING SYSTEM

Original Filed Jan. 27, 1939 3 Sheets-Sheet 2

INVENTOR.
ADOLPH H. ROSENTHAL
BY J. O. Ollier,
ATTORNEY

March 19, 1946. A. H. ROSENTHAL Re. 22,734

TELEVISION RECEIVING SYSTEM

Original Filed Jan. 27, 1939 3 Sheets-Sheet 3

INVENTOR.
ADOLPH H. ROSENTHAL
BY J. D. Allen,
ATTORNEY

Reissued Mar. 19, 1946

Re. 22,734

UNITED STATES PATENT OFFICE 22,734

TELEVISION RECEIVING SYSTEM

Adolph Henry Rosenthal, New York, N. Y., assignor, by mesne assignments, to Scophony Corporation of America, New York, N. Y., a corporation of Delaware Original No. 2,330,171, dated September 21, 1943, Serial No. 253,182, January 27, 1939. Application for reissue June 27, 1944, Serial No. 542,279. In Great Britain February 3, 1938

64 Claims. (Cl. 178—7.5)

The present invention relates to signal reproducing systems, such as for television reception.

It has been proposed to use in a television receiver an image screen, the opacity or the reflecting power of which changes from point to point according to the intensity values of the received picture signals, so that such a screen if viewed directly or imaged by the light from a separate source on to another screen gives a representation of the picture. For such screens it has been proposed to use mechanical shutters, electro-optical or dichroic media, orientation effects in colloids and like substances, the changes in opacity or reflecting power being usually effected by scanning the screen with a cathode ray beam modulated in intensity in accordance with the received picture signals.

The present invention is concerned with a novel form of screen of this type, and to this end makes use of certain physical effects, discovered and investigated in connection with work on electric conduction in solid bodies, these effects also being closely connected with electrical and thermal changes in luminous phosphors, and with the formation of the photographic image.

If certain crystals, which are normally transparent to visible light, are struck by a beam of cathode rays, X rays, radium rays or by light of a suitable wave length, a deposit of opaque material, which is constituted by what will hereinafter be referred to as "opacity centres," is created in this crystal, the degree of opacity depending on the intensity of the incident radiation. Examples of such crystals are many of the alkali and alkaline earth halides, such as the chlorides, bromides and iodides of sodium and potassium, lithium bromide, calcium fluoride, and strontium fluoride, and chloride; and also certain silver salts such as silver bromide. All these crystals belong to the class of the so-called "ionic crystals," in which there are electrically positive and negative components, and the forces that hold these components together are electrostatic, at least in part. In the case of the alkali halide crystals research has indicated that the opacity centres probably consist of neutral alkali atoms comprised of positive and negative charges loosely bound together and inserted in the crystal lattice in some manner or other, and which may be compared with the deposit of metallic silver in a latent photographic image.

Once formed, the opaque deposit can also be destroyed by the above mentioned rays, the amount of destruction in a given time interval depending on the intensity of the rays and on the density of the deposit already formed. Thus the gross effect of any given intensity of the incident radiation, being the result of an equilibrium between the formation and destruction of the deposit, may be for instance an increase of the deposit for lower intensities and a decrease for the higher intensities in a manner similar to the well known "solarisation" of the latent photographic image. In this case, over a range of lower intensities of the incident radiation, increase in intensity will result in an increase of the deposit, whilst over a range of higher intensities an increase in intensity will result in a decrease of the deposit.

The materials exhibiting this property may be defined as ionic crystals in which the injection of electrons into the crystal lattice can produce an opaque deposit which can be moved within the crystal lattice by an electric field and heat.

The present invention contemplates the use of a transparent crystalline material of the type defined in the image screen for instance of a television receiver. The material may be in the form of a single flat crystal, a mosaic of small crystals, or a micro-crystalline structure. A composite crystal (solid solution) or a mixture of two or more of such crystalline materials may be used.

In most cases, and particularly when the material is in the form of a single crystal, a disappearance of the opaque deposit can be produced by maintaining the crystal in an electric field and at a suitable temperature, in which case the deposit is drawn through the crystal towards the positive pole producing the electric field. When it reaches the positive pole it disappears, leaving the crystal substantially transparent. The speed of movement of the deposit depends upon the strength of the field and upon the temperature, and can be varied within wide limits by varying either magnitude. For a given field strength this speed of movement increases with the temperature of the crystal.

According to the present invention there is provided a method of signal reproduction, particularly for television reception which comprises impinging upon, particularly scanning a screen including a material of the type described with a beam of radiant energy modulated in intensity in accordance with the received signals to produce in elemental portions of said screen impinged by the beam an apaque deposit as herein defined, the density of which differs from a fixed datum level of density by an amount depending upon the instantaneous value of the intensity of the impinging beam, and causing the density of said deposit to return to said datum level. In particular, and with television, the opaque deposits, if any, are produced periodically at frame scanning frequency and are caused to disappear and the affected elemental screen portions are thereby returned to the fixed datum level essentially at the end of a frame scanning period.

The datum level of density may be zero, in which case the impinging beam produces directly an opaque deposit in each elemental portion of the screen corresponding in density to the instantaneous intensity of the impinging beam, and with television this deposit is caused to disappear periodically at the frame scanning frequency.

Alternatively the datum level of density may correspond to black, in which case the beam, if it strikes an elemental portion, is adapted to remove the deposit therefrom to an extent depending upon its instantaneous intensity and the density of the deposit thus changed in an elemental portion is caused to return to a maximum value corresponding to black, and with television periodically at frame scanning frequency.

The invention will now be described by way of example and for television with reference to the accompanying drawings in which.

Figure 1:
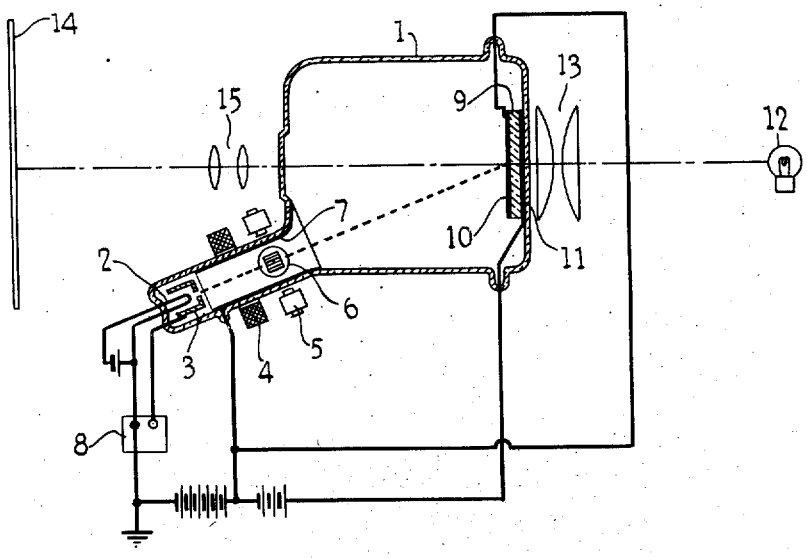
Figs. 1 and 2 show forms of the apparatus used according to the invention in which the image screen consists of a crystal scanned by a cathode ray beam.

Referring to Fig. 1, a cathode ray tube 1 is provided with a cathode 2, a control grid 3, a beam focussing coil 4, deflecting coils 5, 6, and an accelerating anode 7. Picture signals from the receiver 8 are applied between the cathode and control grid in such a way that the positive potential of the grid decreases with increase in signal strength, so that a modulated beam is produced and is swept over the image screen in the usual manner. The image screen consists of a flat crystal 9 of an alkali halide such as potassium chloride, provided on each side with an electrode 10, 11 designed to permit the passage of light. These electrodes are shown in the form of thin transparent spattered metallic layers, but they can also be in the form of fine meshes or the like. The potential of the electrode 11 is maintained positive with respect to that of the electrode 10 to provide an electric field across the crystal. The crystal 9 is traversed by light from the incandescent lamp 12 which is concentrated on the projection lens 15 by the optical condenser 13, and a magnified image of the crystal is formed on the projection screen 14 by means of the projection lens 15.

The apparatus operates as follows:

On striking a given elemental portion of the crystal 9, the modulated cathode ray beam produces therein an opaque deposit of a density corresponding to the instantaneous intensity of the beam. If this intensity be practically zero, of course no such deposit will be produced. After the beam leaves this portion in which a deposit has been produced, the latter persists and moves through the crystal in the direction of its thickness towards the more positive electrode 11, where it disappears. This phenomenon can be explained by assuming that the incident cathode ray beam injects into the elemental portion of the crystal a number of electrons corresponding to the instantaneous intensity of the beam when it strikes the portion. These tend to travel as free electrons towards the postive electrode through the crystal lattice, which is composed of alternate positive alkali ions and negative halogen ions. During this travel certain electrons will be captured by the alkali ions, which have a great electron affinity. An alkali ion and an electron together form an electrically neutral metallic alkali atom which constitutes the above mentioned opacity centre, and thus the position of each captured electron is made visible in the form of an opacity centre. The impinging electrons of the cathode ray beam may release secondary electrons in greater numbers on their impact. These secondary electrons also tend to travel inside the crystal lattice, thus increasing the effect. Sometime later, by the heat movement of the lattice (the crystal being held at the necessary temperature) the metallic alkali atom is again split up into an ion and an electron, and the freed electron continues its path through the lattice towards the positive electrode until it is again captured by another alkali ion, forming a visible opacity centre nearer to the positive electrode. Thus the stream of electrons shot into the crystal by the beam and moving towards the positive electrode appears in the form of an opaque deposit constituted by the opacity centres and moving through the crystal towards the positive electrode and disappearing there.

The velocity of this opaque deposit is proportional to the electric field strength in the crystal and increases also with an increase in temperature of the crystal. By a suitable choice of these magnitudes in relation to the thickness of the crystal the time period within which the deposit in a given elemental portion traverses the thickness of the crystal is predeterminable, and with television, it can be arranged that this time period equals substantially the picture frame scanning period, i. e. the time interval between two consecutive scannings of the elemental portion by the beam. The opacity of a given elemental portion, which corresponds to the intensity of the impinging beam, will thus remain essentially constant until the beam strikes the portion at the next scan, when the opacity will immediately adjust itself to the new value of the impinging beam. Thus each elemental portion of the screen maintains its intensity value essentially constant for the time period of the persistence of an opaque deposit, if any is produced, and with television essentially for the whole duration of a picture frame.

Although the deposits if produced in a given elemental portion must be caused to disappear periodically at substantially frame scanning frequency, the disappearance of one deposit need not coincide exactly with the formation of a new deposit in that portion but can occur at slightly later time. This can be achieved by regulating the velocity of the opaque deposit produced in an elemental portion by one scan in such a way that it has not quite reached the positive electrode when the succeeding scan reaches the portion. Thus any desired slight overlapping may be obtained.

From the foregoing it is obvious that the picture repetition frequency can be much lower than is usual with normal reception methods since the intensity is held constant during the whole frame period and no flickering occurs. The minimum repetition frequency is now determined only by the demands of the eye in perceiving continuous movement, and can be about 17–20 frames per second. This enables a considerable reduction in the necessary frequency band width of the transmitted signals to be achieved, or allows with the same band width a higher definition to be obtained, or permits of the use of the free part of the band for other purposes.

The fugitive image produced in the crystal screen is thus comprised of a multitude of opacity centres created and co-existing for a limited time period in different elemental portions of the screen, and represents intelligible matter by the combined effect of more or less transparent or opaque elemental screen portions and can be regarded as the equivalent of a photographic image on a lantern slide or a cinema film. But this pseudo photographic image lasts, with television, only for the duration of a frame scanning period, and is then replaced by the new image on the same carrier. Thus the effect is similar to that of the so-called intermediate film process, but with the advantages that (1) no time is lost for processing, and (2) one frame is replaced by the next on the same carrier, no film being consumed. The interchange of the consecutive frames is brought about by the diffusion of electrons across the thickness of the crystal under the influence of the electric field.

It is not essential to have two electrodes as shown for setting up the electric field. The electrode 10 can usually be dispensed with since the cathode ray beam striking the surface of the crystal 9 will cause an emission of secondary electrons, thereby setting up an equilibrium potential of a certain fixed value. The electrode 11 is then maintained positive with respect to this equilibrium potential. In certain cases the electrode 11 can also be dispensed with. For example if the ratio of secondary electrons ejected from the crystal to primary electrons incident on the crystal is less than 1, the equilibrium potential will approach that of the cathode 2, in which case the potential of the opposite surface of the crystal will be more positive to an extent depending on the leakage resistance between the anode 7 and the end wall of the tube 1. This leakage resistance may be predetermined by giving to the inner surface of the tube a certain conductivity, in any known manner.

The surface struck by the cathode ray beam may be provided with a secondary electron emitting layer for which the ratio of secondary electrons emitted thereby to primary electrons incident thereon is high, such as beryllium. By this means, full use of the increase in the effect caused by secondary electron emission previously mentioned may be made.

Figure 2:
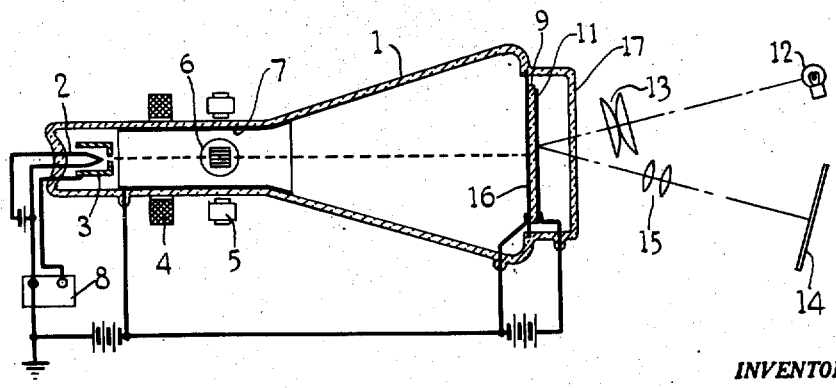

In Fig. 2 is shown an alternative arrangement in which the crystal 9 is situated outside the cathode ray tube 1 and inside a container 17 which forms a continuation of the tube. The end wall of the tube 1 comprises a thin layer of metal foil 16 which permits of the passage of the cathode ray beam, and which also serves as one electrode of the crystal. In this case the image of the crystal is formed on the projection screen 14 with the aid of light reflected or scattered from the layer 16 as shown. Alternatively, the crystal can be illuminated with diffuse light and viewed directly, thus presenting a surface image similar to a photographic paper image.

Figure 3:
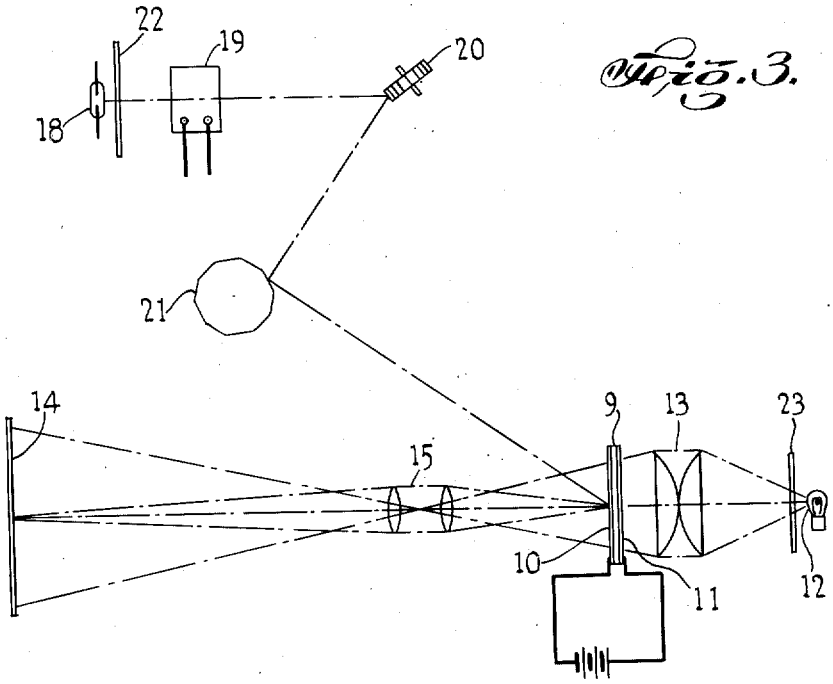
Fig. 3 shows the use of a light beam for scanning the crystal.

In Fig. 3 is shown the use of a light beam instead of a cathode ray beam for creating the opacity in the crystal. A beam of light from the source 18, shown as a luminous discharge tube is modulated in intensity in accordance with received picture signals by the light modulator 19, which can be of any suitable type, and is caused to scan the crystal by means of the two scanning members 20, 21. Light from the source 12, is shown as an incandescent lamp, is utilized to form an image of the crystal on the projection screen 14. The maximum emission of the light source 18 must occur at wavelengths appropriate to the production of the necessary opacity in the crystal, which are usually in the region of the shorter wavelengths, such as ultraviolet, whilst the maximum emission of the light source 12 must occur at different wavelengths in order that it should not disturb the proper formation of the opacity in the crystal. This differentiation may be assisted, if desired, by the use of suitable filters, indicated at 22 and 23.

In the embodiment described, no special means have been shown for maintaining the crystal at a constant predetermined temperature. In many cases the heat produced by the incident cathode ray beam, or by the heat rays emitted by the incandescent lamp 12, or by both, will be found sufficient to maintain the crystal at the desired temperature. Where higher temperatures, or a more exact temperature control is required, special means may be provided, two examples of which are illustrated in Figs. 4 and 5.

Figure 4:
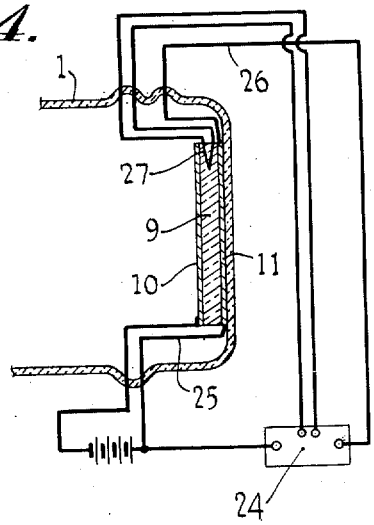
Figs. 4 and 5 show apparatus for heating the image screen.

In Fig. 4 the crystal 9 is heated by means of an electric current from a source 24 which is passed through the electrode 11 via the conductors 25, 26. This heating current is controlled to maintain the crystal at a constant predetermined temperature by means of the thermocouple 27 inserted into the crystal and electrically connected to control the source 24 in any suitable manner. This heating can be applied to any of the electrodes shown in the previous figures.

Figure 5:
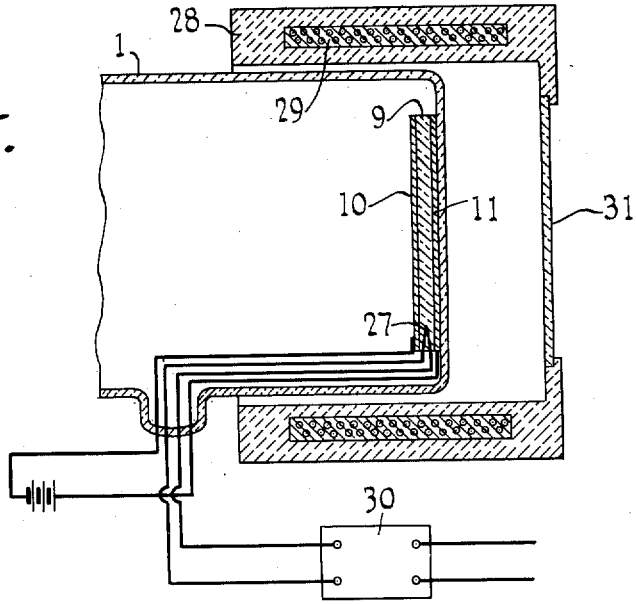

In Fig. 5 the heating is effected by means of an oven 28 surrounding the crystal 9 and comprising a heating coil 29 fed with current from the source 30, the heating current being controlled by means of the thermocouple 27. The oven is provided with a window 31 to allow the necessary light to illuminate the crystal. In the arrangement of Fig. 2 a flow of air or other gas heated to a controlled temperature can be circulated through the container 17 to heat the crystal.

In the arrangement hitherto described the removal of the opaque deposit has been caused by maintaining the screen in an electric field and at a suitable temperature so as to produce a mobility of the deposit. However, as already mentioned, the application of cathode rays or light of a suitable wavelength to the material also produces a removal of the deposit. This method may be used instead of or in addition to the method hitherto described particularly in cases where a sufficient mobility of the deposit is difficult to obtain. The method will be described with reference to Figs. 6 and 7.

Figure 7:
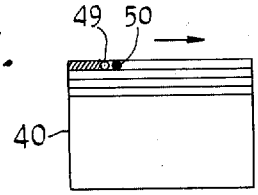
Figs. 6 and 7 show schematically an alternative method of carrying the invention into effect.
Figure 6:
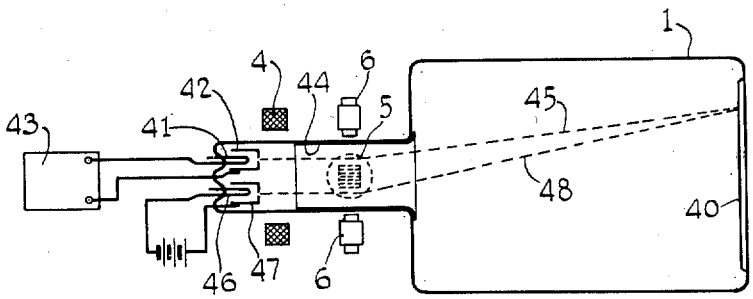

In Fig. 6 there is shown a cathode ray tube 1 in plan view, which is provided with screen 40 consisting of a micro-crystalline deposit of a suitable alkali halide such as potassium chloride, sodium iodide or a mixture of the two. The tube is provided with two electron gun structures provided with a common focussing coil 4, and common deflecting coils 5, 6 and a common anode 44. One structure includes a cathode 41 and a control grid 42, connected across a source of picture signals 43. This structure produces a cathode ray beam 45 of an intensity suitable to the production of an opaque deposit in the material of screen 40, and the intensity of the beam is modulated in accordance with the received signals representative, for instance, of picture points, in such a way that the intensity of the beam decreases with increase of signal strength. The second structure includes a cathode 46 and a grid 47, the latter being maintained at such a positive potential with respect to the cathode 46, that an unmodulated cathode ray beam 48 is produced, its intensity being sufficient to cause a removal of the opaque deposit produced by the beam 45. The relative positions of the two scanning spots produced by the two beams are shown in Fig. 7 where the line scanning is effected in the direction of the arrow, 49 being the signal modulated image forming spot corresponding in its intensity to the beam 45, whilst 50 is the deposit removing spot corresponding to the beam 48 and which precedes 49 and is closely adjacent thereto. It will be observed that if an opaque deposit has been produced in an elemental portion of the screen 40 at the spot 49, it will persist essentially until that portion is struck by beam 48, and therefore, with television, it will persist for almost a full frame scanning period when it is removed by beam 48 (preceding beam 45 for a very small fraction of a frame scanning period) and can be immediately replaced by a new deposit produced by beam 45.

The apparatus illustrated in Fig. 6 may be operated in an alternative manner, by adjusting the positive bias on the grid 47 to such an extent that the beam 49 is of an intensity appropriate to the production in the material of screen 40 of a uniform opaque deposit corresponding to picture black. The positive bias is then adjusted such that the beam 45 is now of an intensity that it will cause a removal of this deposit. This beam is modulated in intensity in accordance with the received picture signals in such a way that an increase in intensity of the beam corresponds to an increase in signal strength, so that the deposit will either remain unaffected or be removed to an extent depending upon the intensity of the beam 45. Thus the deposit remaining in an elemental portion of screen 40 after the passage of the spot 49 by beam 45, will persist until the arrival of beam 48, and if the opacity of spot 49 has been reduced previously, this opacity will momentarily increase to a value corresponding to picture black, and can again be reduced to a new value by the succeeding beam 45.

In most television transmission systems, synchronising signals are transmitted in the intervals between successive lines and frames. In these intervals a fly-back of the cathode ray beam occurs. These synchronising signals are usually of the "blacker than black" type, so that if they are applied to the control grid of a cathode ray tube together with the picture signals, they suppress the cathode ray beam during the fly-back. In cases where a positive control is used, that is, where an increase in the intensity of the cathode ray beam produces an increase in the "white" value of the image screen, this method is useful. This case occurs in the ordinary fluorescent screen type of cathode ray tube, and in the embodiment of the present invention in which the datum level of density of the deposit corresponds to picture black. Where a negative control is used, as in the embodiments of the present invention in which the image screen is initially transparent and the density of the deposit increases with the increase in the intensity of the scanning beam, the blacker-than-black impulse would produce a beam of increased intensity, with the result that a series of opaque lines would be traced by the cathode ray beam during the fly back between successive picture lines, and an opaque line across the picture would be traced during the fly back between successive picture frames. This disadvantage can be avoided by reversing the direction of the synchronising signal, applied to the control grid so that they lie in the "white" direction and produce a reduction in the intensity of the beam.

The micro-crystalline layer mentioned in connection with Fig. 6 is very easily obtainable in any desired thickness by subliming the material directly on to the wall of the cathode ray tube, or on to a transparent metallic film which can serve as an electrode. The material is preferably placed in a small boat or container inside the cathode ray tube and connected in series with a ring shaped copper strip and the layer is formed by heating the boat with eddy currents induced in the strip by means of an external induction coil of an eddy current heater. Very uniform deposits of the material or a mixture of materials can be obtained in this manner.

The sensitivity of the crystalline material will depend on the treatment during its formation. Any treatment which tends to disturb the regularity of the lattice will tend to give an increased sensitivity. For example, a rapid formation of the crystal, or the introduction of foreign atoms or molecules into the crystal lattice will usually increase the sensitivity.

Thus in the case of potassium halides, molecules of KH or $K_2O$ can be introduced by heating the crystals in an atmosphere of hydrogen or oxygen. Also traces of heavy metals, such as silver or thallium may be added.

The terms "radiant energy" and "beam of radiant energy" used in some of the appended claims, are to be understood to mean, respectively, energy and a beam comprised of cathode rays, X-rays, radium rays or light of wave lengths appropriate to produce or reduce, respectively, opacity in ionic crystal material of a nature in which such incident energy or beam can produce or destroy opacity centres and opaque deposits constituted by them, as hereinbefore defined. Also, in certain of the claims, the deposits created in a normally transparent ionic crystal material layer, or transparent areas in a normally opaque or picture black layer, are referred to as "areas" having light transmitting qualities differing from the normal light transmitting qualities of the layer.

I claim:

1. In cathode ray tube apparatus for reconstituting pictures from received picture signals comprising an image screen adapted to have its light transmitting faculty varied periodically point by point by a cathode ray beam scanning it, means for developing a cathode ray beam, means for modulating the intensity of said beam and means for deflecting said beam periodically to cause it to scan said image screen, a screen structure constituting said image screen and including an ionic crystal material of the type in which the injection of electrons into the crystal lattice can produce an opaque deposit which can be moved within the crystal lattice by an electric field and heat, means for maintaining the surface of said screen which is struck by said beam at a lower positive potential than the opposite surface of said screen, means for heating said screen, and thermostatic controlling means adapted to act on said heating means to maintain constant the temperature of said screen.

2. A cathode ray tube for producing a visible presentation from received signals comprising an image screen including an ionic crystal material of the type in which the injection of electrons into the crystal lattice can produce an opaque deposit which can be moved within the crystal lattice by an electric field, means for developing a first beam of cathode rays of lower intensity adapted to create an opaque deposit in said material, means for developing a second beam of cathode rays of higher intensity adapted to reduce said deposit, means for modulating the intensity of one of said beams in accordance with said signals, means for directing said beams onto different elemental portions of said screen so that the unmodulated beam precedes the modulated beam in the scanning direction, and means for deflecting said beams in synchronism over said screen.

3. In and for electric picture reconstituting apparatus of the scanning transparency control type, an image screen adapted for use as the transparency-controlled member which includes an ionic crystal material of the type in which the injection of radiant energy into the crystal lattice can produce an opaque deposit which can be moved within the crystal lattice by an electric field, means for scanning said screen with a first beam of radiant energy, means for modulating said beam, in accordance with received picture signals within the range of those lower intensities for which the density of the opaque deposit produced in any scanned elemental portion of said image screen differs, by an amount depending upon the instantaneous value of the intensity of said beam when striking said portion, from a datum level represented substantially by zero density, and means for scanning said screen with a second beam of radiant energy having a constant higher intensity adapted to remove the deposits formed through the scanning action of said first beam, said last mentioned means being adapted to cause said second beam to precede said first beam in the scanning direction.

4. In and for electric picture reconstituting apparatus of the scanning transparency control type, an image screen adapted for use as the transparency-controlled member which includes an ionic crystal material of the type in which the injection of radiant energy into the crystal lattice can produce an opaque deposit which can be moved within the crystal lattice by an electric field, means for scanning said screen with a first beam of radiant energy, means for modulating said beam, in accordance with received picture signals, within the range of those higher intensities for which the density of the opaque deposit produced in any scanned elemental portion of said image screen differs, by an amount depending upon the instantaneous value of the intensity of said beam when striking said portion, from a datum level represented by a maximum corresponding to picture black, and means for scanning said screen with a second beam of radiant energy having a constant lower intensity adapted to create a uniform deposit in the image screen, said last mentioned means being adapted to cause said second beam to precede said first beam in the scanning direction.

5. In cathode ray tube picture reconstituting apparatus of the scanning transparency control type, an image screen adapted for use as the transparency-controlled member which includes an ionic crystal material of the type in which the injection of electrons into the crystal lattice can produce an opaque deposit which can be moved within the crystal lattice by an electric field and heat, means for scanning said screen with a cathode ray beam, means for modulating, in accordance with received picture signals said beam within the range of intensities for which the density of the opaque deposit produced in any scanned elemental portion of said image screen differs, by an amount depending on the instantaneous value of the beam striking said portion, from a datum level represented substantially by zero density, means for maintaining the surface of said screen where an opaque deposit so produced is to disappear, at a higher positive potential than the opposite surface of said screen, and means for heating said screen.

6. The combination in an image forming apparatus, of a layer of an ionic crystal material of the type in which the injection of radiant energy of proper intensity can produce movable opaque deposits and change their density, said layer including two opposite faces, means to scan one of said faces with a beam of radiant energy modulated in intensity in accordance with received signals to vary the light transmitting qualities of elemental portions of said layer from a normal datum level by creation in the layer of areas movable between said faces and having light transmitting qualities differing from said datum level to thereby create an image perceptible in the direction of movement of said areas, and means to restore varied light transmitting qualities of elemental portions of said layer to said normal datum level within a predetermined time period.

7. The combination as set forth in claim 6 wherein said restoring means is a second beam of radiant energy.

8. The combination as set forth in claim 6 wherein said restoring means include means operative in producing an electric field capable of moving said opaque deposits in the layer.

9. The combination as set forth in claim 6 wherein said restoring means at least includes means to maintain one of said faces at a higher positive potential than the other.

10. The combination as set forth in claim 6, for use in television reception, wherein said restoring means is effective within a time period substantially corresponding to a frame scanning interval.

11. The combination as set forth in claim 16 wherein said layer of ionic crystal material is in micro-crystalline form.

12. The combination as set forth in claim 6 wherein said layer of ionic crystal material is an alkali halide.

13. The combination as set forth in claim 6 wherein said layer of ionic crystal material is an alkali halide in micro-crystalline form.

14. The combination as set forth in claim 6, wherein ionic crystal material of said layer exhibits lattices of disturbed regularity exemplified by lattices in which foreign matter is introduced and lattices resulting from rapid crystal formation.

15. The combination as set forth in claim 6 wherein said layer of ionic crystal material includes on its scanned face a coating having a high degree of secondary electron emission.

16. The combination in an image forming apparatus, of a layer of an ionic crystal material of the type in which the injection of radiant energy of proper intensity can produce movable opaque deposits and change their density, said layer including two opposite faces, means to scan one of said faces with a beam of radiant energy modulated in intensity in accordance with received signals to vary the light transmitting qualities of elemental portions of said layer from a normal datum level by creation in the layer of areas movable between said faces and having light transmitting qualities differing from said datum level to thereby create an image perceptible in the direction of movement of said areas, and means to restore varied light transmitting qualities of elemental portions of said layer to said normal datum level by moving said areas from one of said opposite faces to the other to thereby disappear within a predetermined time period.

17. The combination as set forth in claim 16, wherein said restoring means include means operative in producing an electric field across said layer capable of moving said opaque deposits across the layer.

18. The combination as set forth in claim 16 wherein said means to restore the normal light transmitting qualities of elemental portions includes at least means to maintain said scanned face at a lower positive potential than the opposite face which comprises a pair of electrodes, each adjacent one of said faces, at least one of the electrodes being essentially transparent.

19. The combination as set forth in claim 16 wherein said means to restore the normal light transmitting qualities of elemental portions includes at least means to maintain said scanned face at a lower positive potential than the opposite face which comprises a pair of essentially transparent electrodes, each positioned at and coextensive with one of said opposite faces.

20. The combination as set forth in claim 16 wherein said means to restore the light transmitting qualities of elemental portions includes at least means to maintain said scanned face at a lower positive potential than the opposite face which comprises a pair of electrodes, each adjacent one of said faces, one of the electrodes being light reflecting and the other being essentially transparent.

21. The combination as set forth in claim 16 wherein said means to restore the normal light transmitting qualities of elemental portions includes at least means to heat said material.

22. The combination as set forth in claim 16, wherein said means to restore the normal light transmitting qualities of elemental portions includes at least in part heat generated within said layer by injected radiant energy.

23. The combination as set forth in claim 16, wherein said means to restore the normal light transmitting qualities of elemental portions include at least in part heat derived from a separate source.

24. The combination in a signals reproducing apparatus, of a layer reproducing signals by variations of its optical qualities, said layer including two opposite faces and mounted to expose one of said faces to a beam of radiant energy, said layer essentially comprised of ionic crystal material of the type in which the injection of radiant energy into the crystal material can produce a variation of its optical qualities from a normal datum level, means for directing a beam of radiant energy varying in accordance with signals to be reproduced upon said exposed face so as to inject corresponding radiant energy into elemental portions of said layer and thereby to vary their optical qualities, and means for restoring the optical qualities of elemental portions varied by said beam to said normal datum level within a predeterminable time period.

25. A cathode ray tube for reproducing signals by variation of the light transmitting qualities of a screen, including, in combination, means for developing an electron stream, a screen including two opposite faces and mounted to present one of said faces to said stream, said screen essentially consisting of ionic crystal material of the type in which the injection of an electron stream can form movable opaque deposits and change their densities, means for varying said stream in accordance with signals to be reproduced so as to vary from a normal datum level the light transmitting qualities of elemental screen portions impinged by said stream and thereby to reproduce said signals in said screen by said deposits or changing their densities, and means for restoring varied light transmitting qualities of elemental screen portions to said normal datum level within a predeterminable time period.

26. A cathode ray tube for reproducing signals by variation of the light transmitting qualities of a screen, including means for developing an electron stream, a screen including two opposite faces and mounted to present one of said faces to said stream, said screen essentially consisting of a layer of ionic crystal material the light transmitting qualities of which can be varied by the injection of an electron stream of controlled intensity and selected from the group of alkali halides consisting of sodium chloride, sodium bromide, potassium chloride, potassium bromide and potassium iodide, means for varying the intensity of said stream in accordance with signals to be reproduced so as to vary from a normal datum level the light transmitting qualities of elemental screen portions impinged by said stream and thereby to reproduce said signals in said screen, and means for restoring varied light transmitting qualities of said elemental portions to said normal datum level within a predeterminable time period.

27. A cathode ray tube as set forth in claim 25, wherein said ionic crystal material is in microcrystalline form.

28. A cathode ray tube as set forth in claim 26, wherein said ionic crystal material is in microcrystalline form.

29. A cathode ray tube as set forth in claim 25, wherein said ionic crystal material exhibits lattices of disturbed regularity exemplified by lattices in which foreign matter is introduced and lattices resulting from rapid crystal formation.

30. A cathode ray tube as set forth in claim 26, wherein said ionic crystal material exhibits lattices of disturbed regularity exemplified by lattices in which foreign matter is introduced and lattices resulting from rapid crystal formation.

31. A cathode ray tube for reproducing signals representative of intelligence by variation of the transparency of a screen comprised by the tube, including means for developing an electron stream, a screen including two opposite faces and mounted to present one of said faces to said stream, said screen essentially consisting of normally transparent ionic crystal material of the type in which the injection of electrons can produce opacity centres which can be moved within the crystal material by an electric field, means for varying said stream in accordance with signals to be reproduced so that in elemental screen portions impinged by said stream said opacity centres are created in numbers corresponding to those of electrons instantaneously injected into said portions and constitute opaque deposits of corresponding opacity-degree which reproduce said signals in said screen, and means operative in producing an electric field in said screen for causing said opacity centres to disappear.

32. In combination with a cathode ray tube as set forth in claim 31, a source of positive potential acting upon said screen so that an electric field can be set up between said potential and another one produced by the electrons of said electron stream.

33. In a cathode ray tube as set forth in claim 31, a positive pole associated with said screen for producing therein an electric field drawing said opacity centres towards said positive pole.

34. A cathode ray tube as set forth in claim 31, wherein the surface of the tube between an accelerating anode on positive potential and one face of said screen associated with the end wall of the tube, is conductive and electrons impinging upon the other screen face can produce by secondary electron emission a potential different from said positive one and a corresponding electric field in said screen.

35. A cathode ray tube as set forth in claim 31, wherein an electric field is produced in the screen by an electrode of high positive potential associated with the screen face which is not impinged by said stream.

36. A cathode ray tube as set forth in claim 31, wherein said means for developing an electron stream include an electrode of high positive potential with respect to the source of electrons of said stream and said electric field in said screen is produced at least in part by said potential on said electrode.

37. The combination in a signals reproducing apparatus, of a layer of an ionic crystal material of the type in which the injection of radiant energy of proper intensity can produce movable opaque deposits and change their density, said layer including two opposite faces, means to scan one of said faces with a beam of radiant energy modulated in intensity in accordance with signals to be reproduced so as to vary the light transmitting qualities of elemental portions of said layer from a normal datum level by creation in the layer of areas movable between said faces and having light transmitting qualities differing from said datum level, means to restore varied light transmitting qualities of elemental portions of said layer to said normal datum level, and means to illuminate said layer with light of wave lengths which will not essentially affect the light transmitting qualities of said layer.

38. The combination in a signals reproducing apparatus, of a layer of an ionic crystal material of the type in which the injection of radiant energy of proper intensity can produce movable opaque deposits and change their density, said layer including two opposite faces, means to scan one of said faces with a beam of radiant energy modulated in intensity in accordance with signals to be reproduced so as to vary the light transmitting qualities of elemental portions of said layer from a normal datum level by creation in the layer of areas movable between said faces and having light transmitting qualities differing from said datum level, means to illuminate said layer from a light and heat producing source and from such direction that changes in light transmission can be made visible in the direction of movement of said areas, and means to restore varied light transmitting qualities of elemental portions of said layer to said normal datum level within a predetermined time period, said restoring means including at least the heat of said illuminating source.

39. The combination in an apparatus for reproducing signals representative of intelligence, of a cathode ray tube comprising a screen of variable transparency for reproducing signals therein, said screen including two opposite faces and essentially consisting of normally transparent ionic crystal material of the type in which the injection of electrons can produce opacity centres which can be moved within the crystal material by an electric field, means for developing an electron stream in said tube and for varying said stream in accordance with signals to be reproduced, said stream impinging upon one of said screen faces and thereby creating in elemental screen portions said opacity centres in numbers corresponding to those of the electrons instantaneously injected into said portions and constituting opaque deposits of corresponding opacity-degree which reproduce said signals in said screen, means cooperating in producing an electric field in said screen for causing said opacity centres to disappear, and means for directing upon and into said screen and thence upon a viewing screen light of wave lengths not essentially affecting the light transmitting qualities of said crystal material.

40. The combination as set forth in claim 39, in which means are provided for imaging said screen of ionic crystal material upon said viewing screen by the light directed upon and into the screen of said crystal material.

41. The combination as set forth in claim 39, in which means are associated with said screen of ionic crystal material for reflecting upon the viewing screen said light directed upon and into the screen of said crystal material.

42. An image forming apparatus comprising a cathode ray tube including a layer of a normally transparent ionic crystal material of the type in which the injection of electrons can produce movable opacity centres, said layer including two opposite faces, means to scan one of said faces with a cathode ray beam modulated in intensity in accordance with signals to be reproduced so as to form opacity centres in the layer to thereby create an image perceptible in a direction substantially normal to said faces, means to move said centers from the face at which they are formed toward the opposite face to thereby disappear, and means to direct visible light through said layer.

43. An image forming apparatus comprising a cathode ray tube including a layer of a normally transparent alkali halide material of the type in which the injection of electrons can produce movable opacity centres, said layer including two opposite faces, means to scan one of said faces with a beam of cathode rays modulated in intensity in accordance with the signals to be reproduced so as to form opacity centres in the layer and thereby create an image perceptible in a direction substantially normal to said faces, means to move said centers from the face at which they are created toward the opposite face to thereby disappear, and means to direct visible light upon one of said faces.

44. An image forming apparatus comprising a cathode ray tube including a layer of a normally transparent alkali halide material of the type in which the injection of electrons can produce movable opacity centres, said layer including two opposite faces, means to scan one of said faces with a beam of cathode rays modulated in intensity in accordance with signals to be reproduced so as to form opacity centres in the layer and to thereby create an image perceptible in said layer in a direction substantially normal to said faces, means to move said centers from the scanned face toward the opposite face to thereby disappear within a predetermined time period, and means to direct visible light upon one of said faces and thence to a viewing screen.

45. An image forming apparatus comprising a cathode ray tube including a layer of a normally transparent alkali halide material of the type in which the injection of electrons can produce movable opacity centres, said layer including two opposite faces, means to scan one of said faces with a cathode ray beam modulated in intensity in accordance with signals to be reproduced so as to form opacity centres in the layer and to thereby create an image perceptible in said layer in a direction substantially normal to said opposite faces, means to maintain the scanned face at a lower positive potential than the opposite face to move said centers to said opposite face to thereby disappear within a predetermined time period, and means to direct visible light through said layer.

46. The combination in an image forming apparatus of a layer of an alkali halide material of the type in which the injection of radiant energy of proper intensity can produce movable opaque deposits and change their density, said layer including two opposite faces, means to scan one of said faces with a first beam of radiant energy modulated in intensity in accordance with signals to be reproduced so as to vary the light transmitting qualities of elemental portions of said layer from a normal datum level by creation in the layer of areas movable between said faces and having light transmitting qualities differing from said datum level constituting an image perceptible in said layer in the direction of movement of said deposits, and means to scan one of said faces with a second beam of radiant energy and constant intensity to restore varied light transmitting qualities of said layer to the normal datum level.

47. In combination, a source of cathode rays, means for modulating the intensity of said cathode rays in accordance with signals representative of intelligence and exemplified by picture signals, a screen including a layer essentially of at least one halide selected from the group consisting of alkali and alkaline earth halides of the type in which the injection of cathode rays can produce a variation of the transparency thereof, said layer on an essentially transparent carrier, means for bombarding elemental portions of said screen with said cathode rays for changing the transparency of said portions in accordance with the intensity of said cathode rays, said screen being adapted to be exposed to a uniform flow of light for modulating elemental areas of said flow in accordance with said signals.

48. In combination, a source of cathode rays, means for modulating the intensity of said cathode rays in accordance with signals representative of intelligence and exemplified by picture signals, an image screen comprising a layer of potassium bromide deposited upon a transparent carrier, means for successively bombarding elemental areas of said screen with said cathode rays, for changing the transparency thereof in accordance with the intensity of said cathode rays, said screen being adapted to be exposed to a uniform flow of light for modulating elemental areas of said flow in accordance with said picture signals.

49. In combination, a source of cathode rays, means for modulating the intensity of said cathode rays in accordance with signals representative of intelligence and exemplified by picture signals, an image screen comprising a layer consisting of a mixture of potassium bromide and potassium hydride deposited upon a transparent carrier, means for successively bombarding elemental areas of said screen with said cathode rays for changing the transparency thereof in accordance with the intensity of said cathode rays, said screen being adapted to be exposed to a uniform flow of light for modulating elemental areas of said flow in accordance with said picture signals.

50. A cathode ray tube including an evacuated glass envelope having a first window portion, a screen comprising a layer of at least one halide selected from the group consisting of alkali and alkaline earth halides of the type in which the injection of cathode rays can produce a variation of the transparency thereof, said screen inside said envelope and associated with said window portion, a source of cathode rays, means for modulating the intensity of said rays in accordance with signals representative of intelligence and exemplified by picture signals, means for deflecting the modulated rays across said screen for changing the transparency of elemental portions thereof in accordance with the intensity of said rays, said envelope provided with a second window portion opposite said first window portion said window portions arranged to permit light from an external source to pass through said envelope and said screen for modulating said light in accordance with said signals.

51. In combination, a source of cathode rays, means for modulating the intensity of said cathode rays in accordance with signals representative of intelligence and exemplified by picture signals, a screen including a layer essentially of ionic crystal material of the type in which the injection of cathode rays into the crystal material can produce a change of its optical qualities from a normal datum level, said layer supported by a carrier, means for bombarding elemental portions of said screen with said cathode rays for changing the optical qualities of said portions in accordance with the intensity of said cathode rays, said screen being adapted to be exposed to a uniform flow of light for modulating elemental areas of said flow in accordance with said signals.

52. In combination, a source of cathode rays, means for modulating the intensity of said cathode rays in accordance with signals representative of intelligence and exemplified by picture signals, an image screen comprising a layer of at least one alkaline earth halide in crystalline state deposited upon a transparent carrier, means for successively bombarding elemental areas of said screen with said cathode rays for changing the transparency thereof in accordance with the intensity of said cathode rays, said screen being adapted to be exposed to a uniform flow of light for modulating elemental areas of said flow in accordance with said picture signals.

53. A cathode ray tube comprising an evacuated glass envelope having a first plane window portion, an image screen comprising a layer of at least one alkaline earth halide in crystalline state deposited on said window portion, a source of cathode rays, means for modulating the intensity of said rays in accordance with picture signals, means for deflecting the modulated rays across said image screen for successively changing the transparency of elemental areas thereof in accordance with the intensity of said cathode rays, said envelope being provided with a second window portion opposite said first window portion and adapted to permit light from an external source to pass through said envelope onto said image screen for modulation thereof in accordance with said picture signals.

54. A cathode ray tube as set forth in claim 31, wherein said screen is associated with and carried by a metallic film essentially transparent for visible light which can serve as electrode.

55. In combination, a source of an electron beam, means for modulating the intensity of said beam in accordance with electric signals representative of intelligence and exemplified by picture signals, a screen including a layer essentially of ionic crystal material of the type in which the injection of electrons can produce a change of its optical qualities, means for bombarding elemental portions of said screen with electrons of said beam for changing the optical qualities of said portions corresponding to the intensity of said beam, a thin essentially metallic layer permeable for electrons associated with the face of said screen exposed to said bombardment, the surface of said metallic layer facing said screen having light reflecting or scattering properties, and the face of said crystal layer remote from said metallic layer arranged for exposure to illuminating light.

56. In combination, a source of cathode rays, means for modulating the intensity of said cathode rays in accordance with electric signals representative of intelligence and exemplified by picture signals, a screen including a layer in the form of a mosaic of small crystals on a carrier, said crystals essentially of ionic crystal material of the type in which the injection of cathode rays can produce a change of its optical qualities, means for bombarding elemental portions of said screen with said cathode rays for changing the optical qualities of said portions corresponding to the intensity of said cathode rays, said screen arranged for exposure to illuminating light for visibly reproducing the intelligence translated upon said screen by said cathode ray bombardment.

57. In combination, a first source of an electron beam, means for modulating the intensity of said beam in accordance with electric signals representative of intelligence and exemplified by picture signals, a screen including a layer essentially of ionic crystal material in which the injection of electrons can produce a change of its optical qualities, means for bombarding elemental portions of said screen with electrons of said beam for changing the optical qualities of said portions corresponding to the intensity of said beam, and a second source of an electron stream of an intensity suitable to remove said changes.

58. The combination as set forth in claim 57, in which said first and second source of electrons and said screen are arranged within an evacuated envelope, said envelope provided with at least one window aligned with said screen so that the latter can be illuminated from the outside of said envelope.

59. In combination, a source of an electron beam, means for modulating the intensity of said beam in accordance with electric signals representative of intelligence and exemplified by picture signals, a screen including a layer essentially of ionic crystal material in which the injection of electrons can produce a change of its optical qualities, means for bombarding elemental portions of said screen with electrons of said beam for changing the optical qualities of said portions corresponding to the intensity of said beam, and a source of infra-red heat rays for erasing changes of the optical qualities of screen portions produced by said electron beam.

60. The combination as set forth in claim 59, in which said source of electrons and screen are arranged within and said source of infra-red rays outside an evacuated envelope, said envelope provided with at least one window aligned with said screen so that the latter can be illuminated from the outside.

61. In combination, a source of an electron beam, means for modulating the intensity of said beam in accordance with electric signals representative of intelligence and exemplified by picture signals, a screen including a layer essentially of ionic crystal material in which the injection of electrons can produce a change of its optical qualities, means for bombarding elemental portions of said screen with electrons of said beam for changing the optical qualities of said portions corresponding to the intensity of said beam, and a coating having a high degree of secondary electron emission on the face of said screen exposed to bombardment by said electrons.

62. The combination in an image forming apparatus, of a layer of an ionic crystal material in micro-crystalline form including two opposite faces and mounted to present one of said faces as an image face, means to scan one of said faces with a radiant beam modulated in intensity in accordance with a received signal to vary the light transmitting qualities of successive elemental portions of said layer from a normal datum level by creation in the layer of areas movable between said faces and having light transmitting qualities differing from said datum level to thereby create an image perceptible at said image face and in the direction of movement of said areas, and means to restore the light transmitting qualities of elemental portions of said layer to said normal datum level within a predetermined time period.

63. The combination as set forth in claim 62, further including means to illuminate at least one of said opposite faces of said layer with light of a wave length which will not affect the light transmitting qualities of said layer and from such direction that changes in light transmission will be perceptible at said image face.

64. The combination as set forth in claim 62, further including means to direct visible light through said layer.

ADOLPH HENRY ROSENTHAL.